(12) United States Patent
Lee

(10) Patent No.: US 12,017,675 B2
(45) Date of Patent: Jun. 25, 2024

(54) VEHICLE AND CONTROL METHOD THEREOF

(71) Applicants: Hyundai Motor Company, Seoul (KR); Kia Corporation, Seoul (KR)

(72) Inventor: Donghoon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 32 days.

(21) Appl. No.: 18/060,777

(22) Filed: Dec. 1, 2022

(65) Prior Publication Data

US 2023/0202499 A1 Jun. 29, 2023

(30) Foreign Application Priority Data

Dec. 28, 2021 (KR) .................. 10-2021-0189173

(51) Int. Cl.
*B60Q 1/00* (2006.01)
*B60W 50/14* (2020.01)
*G06N 3/08* (2023.01)

(52) U.S. Cl.
CPC .............. *B60W 50/14* (2013.01); *G06N 3/08* (2013.01); *B60W 2050/143* (2013.01); *B60W 2050/146* (2013.01)

(58) Field of Classification Search
CPC .......... B60W 50/14; B60W 2050/143; B60W 2050/146; B60W 2540/229; B60W 40/08; B60W 30/14; B60W 40/10; B60W 2040/0863; B60W 2050/0022; B60W 2510/202; B60W 2520/10; B60W 2520/125; B60W 2520/28; B60W 2540/10; B60W 2540/12; G06N 3/08; B60K 28/06; B60K 35/00; B60K 35/28; B60K 2360/11; B60K 2360/178; B60K 35/10; G08B 21/02; G08B 21/06; B60Y 2400/90
USPC .................. 340/438, 439, 576, 575, 457
See application file for complete search history.

(56) References Cited

U.S. PATENT DOCUMENTS

| | | | | |
|---|---|---|---|---|
| 10,752,261 | B2* | 8/2020 | Kim .................. | G06V 20/597 |
| 11,254,319 | B2* | 2/2022 | Iwase ................ | G06V 20/597 |
| 11,731,637 | B2* | 8/2023 | Yamaoka .......... | B60W 30/0956 |
| | | | | 701/1 |
| 2019/0366844 | A1* | 12/2019 | Yoon .................. | A61B 5/18 |
| 2021/0357701 | A1* | 11/2021 | Hyuga ................ | G06N 3/044 |

\* cited by examiner

*Primary Examiner* — Anh V La
(74) *Attorney, Agent, or Firm* — Fox Rothschild LLP

(57) ABSTRACT

Provided is a vehicle, including: a user interface; a driver attention warning (DAW) system configured to determine a first driver attention level based on driving data, and when the first driver attention level is less than or equal to a threshold level, control the user interface to output a warning; and a controller configured to determine a second driver attention level based on an output of a neural network on driving data, compare the first driver attention level and the second driver attention level at predetermined periods, and when a number of times that a difference between the first driver attention level and the second driver attention level is greater than or equal to a predetermined value is greater than or equal to a predetermined number of times, adjust the threshold level in a decreasing direction. The neural network is configured to be trained with driving data.

20 Claims, 9 Drawing Sheets

FIG. 5

| TIME | STEERING ANGLE | STEERING TORQUE | VEHICLE SPEED | ACCELERATION /BRAKE PEDAL | SCC CONTROL STATE | TURN SIGNAL | EMERGENCY LIGHT | ... | DRIVER ATTENTION LEVEL (Raw) |
|---|---|---|---|---|---|---|---|---|---|
| 100ms | 30° | 40N | 40km | Accel. 30% | STATE1 | OFF | ON | ... | 35% |
| 200ms | -30° | 100N | 30km | Brake, 30% | STATE2 | LEFT | OFF | ... | 40% |
| 300ms | 120° | 20N | 70km | - | STATE3 | RIGHT | OFF | ... | 60% |
| ... | ... | ... | ... | ... | ... | ... | ... | ... | ... |
| 1000s | 120° | 20N | 70km | - | STATE2 | OFF | OFF | ... | 60% |

DRIVING DATA

FIRST DRIVER ATTENTION LEVEL

VEHICLE AND CONTROL METHOD THEREOF

CROSS-REFERENCE TO RELATED APPLICATION

This application claims, under 35 U.S.C. § 119, the benefit of Korean Patent Application No. 10-2021-0189173, filed on Dec. 28, 2021, in the Korean Intellectual Property Office, the entire contents of which are incorporated herein by reference.

BACKGROUND

1. Technical Field

The disclosure relates to a vehicle and a control method thereof that may output a driver attention warning.

2. Description of the Related Art

In general, a vehicle is equipped with a driver attention warning (DAW) system that determines a driver attention level and provides a warning when the driver attention level is lower than a threshold level.

In this instance, the DAW system determines a driver attention level based on driving data of the vehicle. However, because a driver attention level is determined according to a uniform standard for driving data, driving characteristics for each driver or actual driving characteristics may not be reflected.

Accordingly, a driver attention warning may be output the same for different drivers having different driving styles. Also, a driver attention warning may be output even in a situation where there are many rotations on a driving path, i.e., a driver attention warning that does not fit the situation may be output. By contrast, a driver attention warning may not be output in a situation where driver attention is actually required.

SUMMARY

An aspect of the disclosure provides a vehicle and a control method thereof that may compare a driver attention level obtained by an output of a neural network and a driver attention level obtained by an output of a driver attention warning (DAW) system, thereby outputting a driver attention warning more accurately.

Additional aspects of the disclosure will be set forth in part in the description which follows and, in part, will be obvious from the description, or may be learned by practice of the disclosure.

According to an embodiment of the disclosure, there is provided an attention warning system for a vehicle, the system including: a user interface; a driver attention warning (DAW) system configured to determine a first driver attention level based on driving data, and if the first driver attention level is less than or equal to a threshold level, control the user interface to output a warning; and a controller configured to determine a second driver attention level based on an output of a neural network on driving data, compare the first driver attention level and the second driver attention level at predetermined time periods. The system may adjust the threshold level in a decreasing direction if: (a) a compared difference between the first driver attention level and the second driver attention level is determined to be greater than or equal to a predetermined value, and (b) a number of the compared differences that are equal to or greater than the predetermined value is recognized for a number of times that is greater than or equal to a predetermined number of times, and the neural network may be configured to be trained with driving data and the first driver attention level.

The controller is further configured to determine a data set including driving data obtained for a predetermined travel time period, and the first driver attention level corresponds to each of the driving data obtained for the predetermined travel time period.

The controller is further configured to: train the neural network with a first data set corresponding to a predetermined ratio from among the data set, and determine an accuracy of the neural network based on driving data of a second data set that excludes the first data set from the data set.

The controller is further configured to determine the second driver attention level as an output of the neural network receiving driving data of the second data set as an input, and compare the determined second driver attention level with the first driver attention level of the second data set to determine the accuracy of the neural network.

The controller is further configured to adjust at least one of: a weight, a bias, and/or an activation function of the neural network to thereby increase the accuracy of the neural network.

The controller is further configured to train the neural network at every predetermined travel time period.

The controller is further configured to determine the second driver attention level through a neural network corresponding to a current driver based on neural network information for each driver.

The controller is further configured to increase a count value by 1 if a state where the difference between the first driver attention level and the second driver attention level is greater than or equal to the predetermined value occurs, and adjust the threshold level in the decreasing direction if the count value is greater than or equal to the predetermined number of times.

The controller is further configured to initialize the count value when a driver is changed or the vehicle is turned off.

The controller is further configured to adjust the count value in a decreasing direction, over time.

The driving data includes at least one of: a lane departure state, a steering angle, a steering torque, a speed, an accelerator pedal state, a brake pedal state, a control state of a smart cruise control (SCC), a turn signal control state, an emergency light control state, a door open/closed state, a seat belt wearing state, a longitudinal/lateral acceleration, a wheel speed, a gear stage, and/or a travel time after a break.

According to an embodiment of the disclosure, there is provided a control method of a vehicle. The method may include the step of providing a user interface and a DAW system configured to determine a first driver attention level based on driving data, and if the first driver attention level is less than or equal to a threshold level, control the user interface to output a warning. The control method including: determining a second driver attention level based on an output of a neural network on driving data; comparing the first driver attention level and the second driver attention level at predetermined time periods a plurality of times; adjusting the threshold level in a decreasing direction if (a) a compared difference between the first driver attention level and the second driver attention level is determined to be greater than or equal to a predetermined value, and (b) a number of compared differences that are equal to or greater than the predetermined value is recognized for a number of times that is greater than or equal to a predetermined number of times, wherein the neural network is configured to be trained with driving data and the first driver attention level.

The control method further includes determining a data set including driving data obtained for a predetermined travel time period, and the first driver attention level corresponds to the driving data obtained for the predetermined travel time period.

The control method further includes training the neural network with a first data set corresponding to a predetermined ratio among the data set; and determining an accuracy of the neural network based on driving data of a second data set that excludes the first data set from the data set.

The determining of the accuracy of the neural network includes: determining the second driver attention level as an output of the neural network receiving driving data of the second data set as an input; and comparing the determined second driver attention level with the first driver attention level of the second data set to determine the accuracy of the neural network.

The control method further includes adjusting at least one of: a weight, a bias, and/or an activation function of the neural network to thereby increase the accuracy of the neural network.

The training of the neural network includes training the neural network at every predetermined travel time period.

The determining of the second driver attention level includes determining the second driver attention level through a neural network corresponding to a current driver based on neural network information for each driver.

The adjusting of the threshold level in the decreasing direction includes: increasing a count value by 1, if the difference between the first driver attention level and the second driver attention level is greater than or equal to the predetermined value; and adjusting the threshold level in the decreasing direction if the count value is greater than or equal to the predetermined number of times.

The adjusting of the threshold level in the decreasing direction includes initializing the count value when a driver is changed or the vehicle is turned off.

The adjusting of the threshold level in the decreasing direction includes adjusting the count value in a decreasing direction, over time.

The driving data includes at least one of: a lane departure state, a steering angle, a steering torque, a speed, an accelerator pedal state, a brake pedal state, a control state of a smart cruise control (SCC), a turn signal control state, an emergency light control state, a door open/closed state, a seat belt wearing state, a longitudinal/lateral acceleration, a wheel speed, a gear stage, and/or a travel time after a break.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 illustrates a data set according to an embodiment;

DETAILED DESCRIPTION

Figure 1:
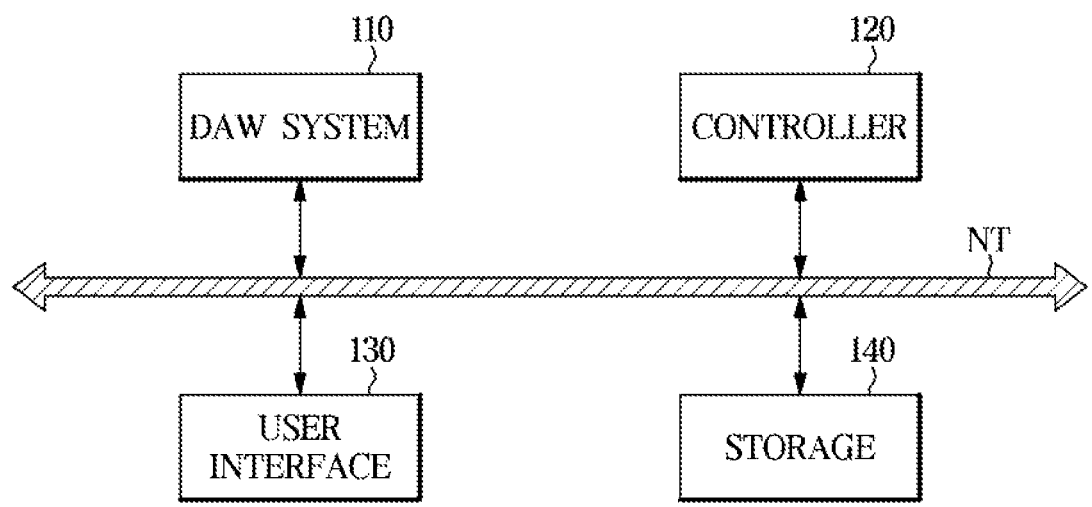
FIG. 1 is a control block diagram illustrating a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It is to be understood that the singular forms are intended to include the plural forms as well, unless the context clearly dictates otherwise.

The terms such as "~part", "~device", "~block", "~member", "~module", and the like may refer to a unit for processing at least one function or operation. For example, the terms may refer to at least one process processed by at least one hardware, such as field-programmable gate array (FPGA)/application specific integrated circuit (ASIC), software stored in memories or processors.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Reference numerals used for method steps are just used for convenience of explanation, but not to limit an order of the steps. Thus, unless the context clearly dictates otherwise, the written order may be practiced otherwise.

Hereinafter, embodiments of a vehicle and a control method of a vehicle according to an aspect of the disclosure will be described in detail with reference to the accompanying drawings.

FIG. 1 is a control block diagram illustrating a vehicle according to an embodiment.

Referring to FIG. 1, according to an embodiment, a vehicle 10 includes a driver attention warning (DAW) system 110, a controller 120, a user interface 130 and a storage 140. Here, the DAW system 110 determines a driver attention level, and when the driver attention level is less than or equal to a threshold level, controls to output a driver attention warning. The controller 120 trains a neural network and adjusts the threshold level of the DAW system 110 based on an output of the neural network. The user interface 130 outputs the driver attention warning, and the storage 140 stores various information required for controlling the neural network, and the like.

According to an embodiment, the DAW system 110 may determine the driver attention level using at least one of driving data or image data of a driver, and when the driver attention level is less than or equal to a predetermined threshold level, control the user interface 130 to output the driver attention warning.

According to an embodiment, the controller 120 may train the neural network based on the driving data and the driver attention level determined by the DAW system 110 based on the driving data.

According to an embodiment, the controller 120 may determine the driver attention level based on the output of the neural network on the driving data, and compare the driver attention level (hereinafter, a first driver attention level) determined by the DAW system 110 with the driver attention level (hereinafter, a second driver attention level) determined by the neural network to determine whether to adjust the threshold level.

Specifically, the controller 120 may count the number of times that a difference between the first driver attention level and the second driver attention level is greater than or equal to a predetermined value, and when a count value is greater than or equal to a predetermined value (a predetermined number of times), control the DAW system 110 to adjust the threshold level in a decreasing direction.

That is, by prioritizing a reliability of the output of the neural network over a reliability of the output of the DAW system 110, when a difference occurs in the output of the DAW system 110 compared to the output of the neural network, the controller 120 may adjust the threshold level in a decreasing direction to increase a sensitivity of the DAW system 110. Accordingly, the driver attention level required for outputting the driver attention warning may be lowered, and thus the vehicle 10 may detect an abnormal state of the driver more sensitively, thereby reducing a risk of an accident.

In addition, the neural network for adjusting the threshold level may be provided and trained for each driver, and thus the driver attention warning may be output by reflecting a driving tendency of each driver.

Training the neural network and adjusting the threshold level of the DAW system 110 using the output of the trained neural network by the controller 120 are described in greater detail again later.

The controller 120 may include at least one memory storing a program for performing the aforementioned operations and operations described below, and at least one processor for implementing a stored program. When a plurality of memories and processors are provided, the plurality of memories and processors may be integrated into one chip, or provided in physically separated locations.

Disclosed systems may be implemented with at least one non-transitory memory storage storing at least one software program contained computer executable code that may be executed by at least one processor to: (a) perform various computer implemented functions and/or (b) transmit at least one control signal to an actuator to perform a mechanically implemented function. In at least one embodiment, the memory storage is configured to store computer executable code that may be fixed, continuously updated over time, and/or trained according to various machine learning techniques, e.g., Supervised Learning, Unsupervised Learning, Semi-supervised Learning, and Reinforcement Learning. Such techniques may implement a corresponding machine learning algorithm, e.g., Linear regression, Logistic regression, Decision tree, SVM algorithm, Naive Bayes algorithm, KNN algorithm, K-means, Random Forest algorithm, Dimensionality reduction algorithms, Gradient boosting algorithm and Ada Boosting algorithm. The processor may be configured to selectively execute aspects of the computer executable code to perform one or more processes upon a defined event, a user request, and in some cases independently without user input.

The control logic of the present disclosure may be embodied as a computer readable media on a computer readable medium (e.g., a "memory storage") containing data including computer executable program instructions that may be selectively executed by a processor, controller, module, unit, or the like. In some embodiments the data and/or instructions may also be distributed in network coupled computer systems in a distributed fashion, e.g., by a networked client-server system, a telematics server, and/or a Controller Area Network (CAN).

In some embodiments, separate programs, and the supporting electronic hardware to execute those programs, may be individually referred to as a "module" to effectively explain and enable the disclosure herein. In some instances, a module may be specifically named and/or include a descriptive label corresponding to the type or function of said module. The plural usage "modules" may refer to at least one module e.g., a first module, second module, etc.

Example corresponding structure of, a "module," "unit," and/or "controller" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. The module/unit/controller may optionally include: antennas, network interfaces that provide wireless and/or wire line digital and/or analog interface to one or more networks over one or more network connections, a power source that provides an appropriate alternating current (AC) or direct current (DC) power source, and a bus that allows communication among the various disclosed components.

It shall be understood that the exemplary processes may be performed by a single module/unit/controller or a plurality of modules/units/controllers that may share a computing resources and structure or where each has its own dedicated computing resources and structure, e.g., a dedicated supporting memory, dedicated processor, power supply, etc. as a person of ordinary skill in the art would understand to be consistent with the disclosure herein.

According to an embodiment, the user interface 130 may output the driver attention warning under control of the DAW system 110.

To this end, the user interface 130 may include at least one of a display for displaying the driver attention warning or a speaker for outputting the driver attention warning.

According to an embodiment, the storage 140 may store various information required for control.

Specifically, the storage 140 may store the driving data measured by various sensors inside the vehicle 10 and the neural network. In particular, the storage 140 may store different neural networks for each driver.

To this end, the storage 140 may be provided as a known type of storage medium, and a type of the storage 140 is not limited.

Constituent components of the vehicle 10 have been described above, and each of the constituent components may transmit and receive data via a vehicle communication network (NT), as shown in FIG. 1.

Hereinafter, operations of the DAW system 110 and adjusting the threshold level using the output of the trained neural network are described.

Figure 2:
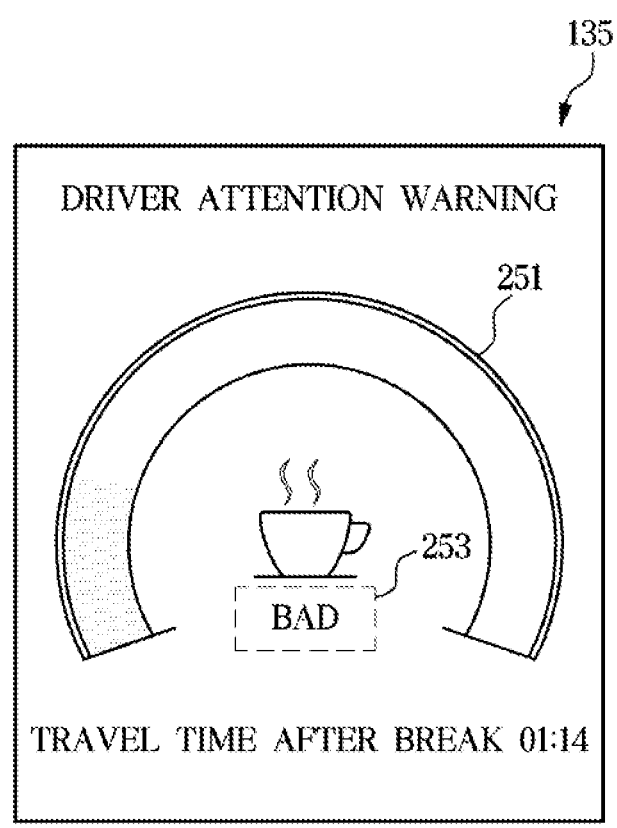
FIG. 2 is a diagram illustrating an example of a driver attention level displayed by a vehicle according to an embodiment.
Figure 3:
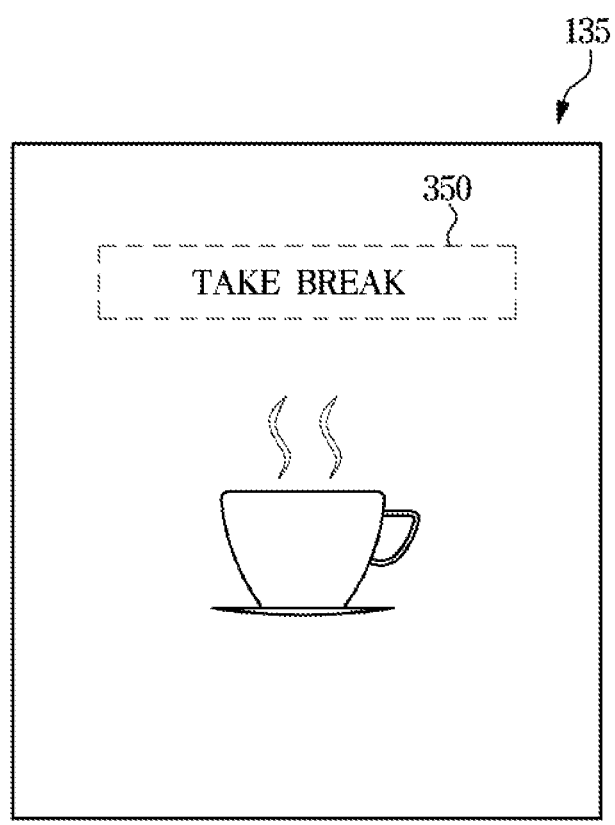
FIG. 3 is a diagram illustrating an example of a driver attention warning output by a vehicle according to an embodiment.

FIG. 2 is a diagram illustrating an example of a driver attention level displayed by the vehicle 10 according to an embodiment. FIG. 3 is a diagram illustrating an example of a driver attention warning output by the vehicle 10 according to an embodiment.

Referring to FIG. 2, according to an embodiment, the DAW system 110 may determine a driver attention level based on at least one of driving data or image data of a driver.

For instance, when it is determined that the vehicle 10 is being driven abnormally based on the driving data, the DAW system 110 may determine that the driver attention level is low, and determine the driver attention level according to a degree of a driving state of the vehicle 10. For example, the DAW system 110 may determine that the driver attention level is low, when the vehicle 10 moves largely in a lateral direction within a lane or returns after crossing a lane, a sudden steering pattern is detected or a small change in steering torque continues.

However, determining the driver attention level by the DAW system 110 is not limited thereto, and any type of known determination methods may be used to determine the driver attention level.

According to an embodiment, the DAW system 110 may control the user interface 10 to output the driver attention level.

For example, a display 135 of the user interface 130 may display a graph 251 filled depending on a degree of the driver attention level, or a message 253 qualitatively indicating the degree of the driver attention level. However, displaying the driver attention level is not limited thereto, and any type of display method may be used as long as a user may recognize the driver attention level.

According to an embodiment, when the driver attention level is less than or equal to a threshold level, the DAW system 110 may control the user interface 130 to output a driver attention warning.

For example, as shown in FIG. 3, the DAW system 110 may control the display 135 of the user interface 130 to display a driver attention warning message 350. Also, although not illustrated in FIG. 3, according to embodiments, the DAW system 110 may control the speaker of the user interface 130 to output a driver attention warning sound.

As such, when the driver attention level becomes less than or equal to the threshold level, the DAW system 110 may control the user interface 130 to output the driver attention warning in order to warn the driver of driver's inattentiveness.

In this instance, when a difference between a driver attention level output through a neural network and a driver attention level output through the DAW system 110 is large, the controller 120 may adjust the threshold level, which is compared with the driver attention level output through the DAW system 110, in a decreasing direction, in order to enable the DAW system 110 to output the driver attention warning more sensitively.

Hereinafter, training the neural network and adjusting the threshold level using the neural network are described in greater detail.

Figure 4:
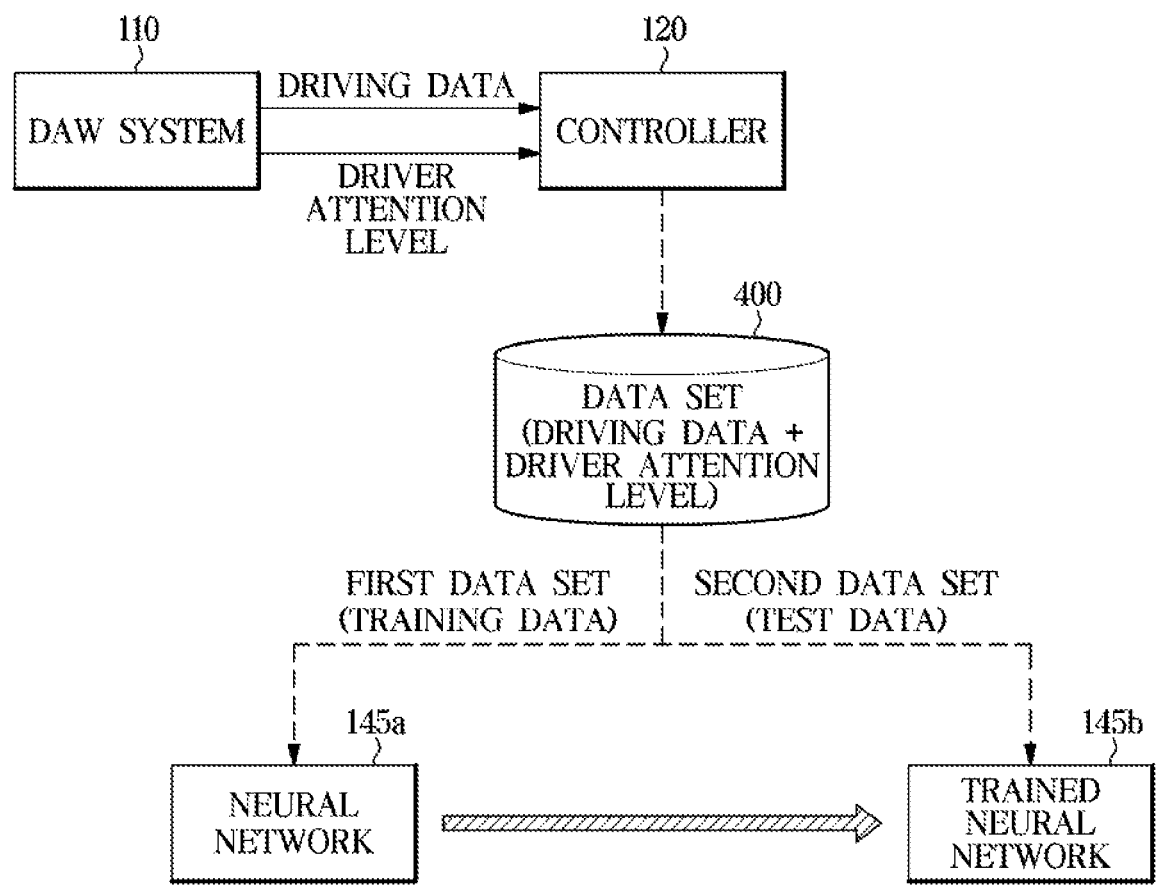
FIG. 4 illustrates an example where a vehicle according to an embodiment trains a neural network.

FIG. 4 illustrates an example where a vehicle according to an embodiment trains a neural network. FIG. 5 illustrates a data set according to an embodiment.

Referring to FIG. 4, according to an embodiment, the controller 120 may obtain, from the DAW system 110, driving data obtained for a predetermined travel time (e.g., 1000 seconds) and a first driver attention level corresponding to each of the driving data obtained for the predetermined travel time.

In this instance, the driving data may be obtained from various sensors of the vehicle 10, and include at least one of a lane departure state, a steering angle, a steering torque, a speed, an accelerator pedal state, a brake pedal state, a control state of a smart cruise control (SCC), a turn signal control state, an emergency light control state, a door open/closed state, a seat belt wearing state, a longitudinal/lateral acceleration, a wheel speed, a gear stage, or a travel time after a break.

According to an embodiment, the controller 120 may determine a data set 400 including the driving data obtained for the predetermined travel time and the first driver attention level corresponding to each of the driving data obtained for the predetermined travel time.

For example, as shown in FIG. 5, the data set 400 may include driving data per time and a driver attention level (the first driver attention level) corresponding to each of the driving data. In this instance, as described above, the first driver attention level may correspond to a value calculated by the DAW system 110 based on the driving data. Also, the DAW system 110 may determine the first driver attention level corresponding to a dependent variable, through a predetermined calculation formula using the driving data as an independent variable.

According to an embodiment, the controller 120 may divide the data set 400 into two data sets at a predetermined ratio. For example, the controller 120 may train a neural network 145a with a first data set accounting for a predetermine ratio (e.g., 70%) of the data set 400, and determine an accuracy of a trained neural network 145b based on driving data of a second data set excluding the first data set from the data set 400.

That is, the controller 120 may train the neural network 145a with the first data set as training data.

Because the above-described neural network 145a refers to a machine learning that models a neural structure capable of performing deep learning, a reliability of learning may be improved as a weight and a bias which are a component of the neural network 145a continuously changes. That is, the neural network 145*a* continuously updates the weight, the bias and an activation function included in the neural network 145*a*, based on the driving data and the first driver attention level determined according to the driving data, thereby may improve an inference result of the neural network 145*a*. Here, for example, learning may be a supervised learning in which the driving data is input and the corresponding first driver attention level is output.

The neural network 145*a* may include a convolutional neural network (CNN) that generates a feature map output by performing a convolution operation with respect to the driving data and inputs the feature map into the neural network 145*a*, without being limited thereto. The neural network 145*a* may be performed with other deep learning algorithms including recurrent neural networks (RNNs) and a long short term memory (LSTM). That is, a type of the neural network 145*a* is not limited.

Also, the controller 120 may test the trained neural network 145*b* using the second data set as test data.

Specifically, the controller 120 may determine a second driver attention level as an output of the neural network 145*b* in which the driving data of the second data set is input, and compare the second driver attention level with a first driver attention level of the second data set to determine an accuracy of the neural network.

When a difference between the second driver attention level corresponding to the output of the neural network 145*b* and the first driver attention level of the second data set is less than a predetermined value, the controller 120 determines that the accuracy is less than a predetermined accuracy and may adjust at least one of the weight, the bias, or the activation function of the neural network 145*b* to increase the accuracy of the neural network 145*b*.

As such, the vehicle 10 divides the data set 400 into two data sets, trains the neural network 145*a* with a single data set, and tests the trained neural network 145*b* using the other data set for re-training, thereby improving the accuracy of the neural network 145*b*.

According to an embodiment, the controller 120 trains the neural network 145*a* at every predetermined travel time, and thus the neural network 145*a* may be trained continuously.

Also, according to an embodiment, the controller 120 may train a neural network corresponding to a current driver based on neural network information for each driver.

Figure 6:
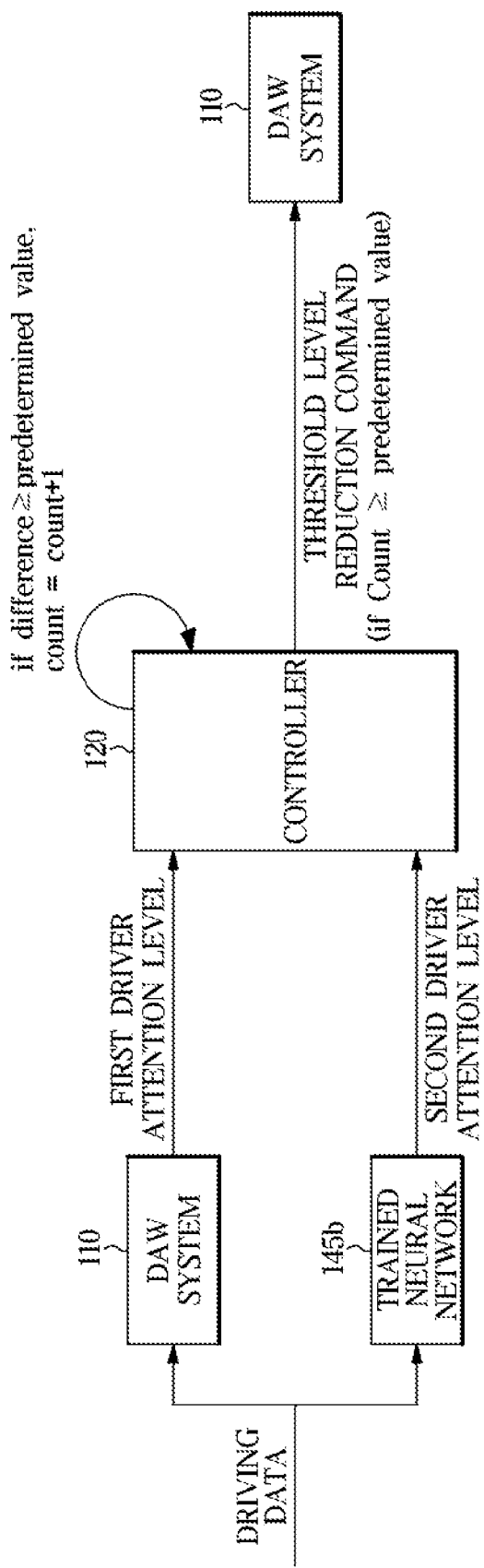
FIG. 6 illustrates an example where a vehicle according to an embodiment compares driver attention levels output by each of a driver attention warning (DAW) system and a neural network.
Figure 7:
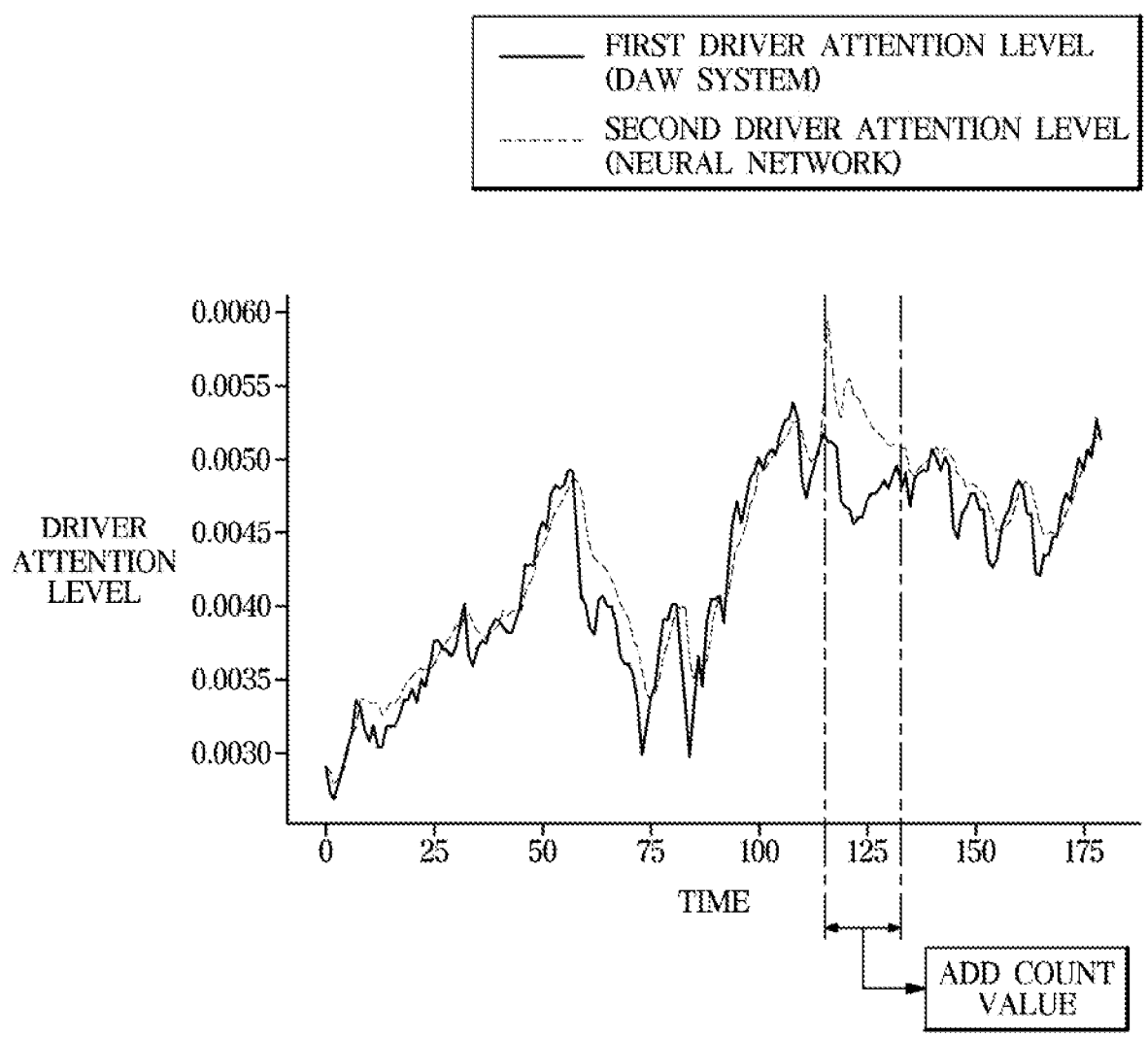
FIG. 7 illustrates a difference in driver attention level output by each of a DAW system and a neural network according to an embodiment.

FIG. 6 illustrates an example where the vehicle 10 according to an embodiment compares driver attention levels output by each of the DAW system 110 and the neural network 145*b*. FIG. 7 illustrates a difference in driver attention level output by each of the DAW system 110 and the neural network 145*b* according to an embodiment.

Referring to FIG. 6, according to an embodiment, the controller 120 may determine a second driver attention level based on an output of the neural network 145*b* on the driving data. That is, based on driving data at a corresponding point in time as an input, the neural network 145*b* may output a driver attention level corresponding to the driving data.

According to an embodiment, the controller 120 may compare the second driver attention level determined by the output of the neural network 145*b* with a first driver attention level determined by the DAW system 110.

In this instance, when the number of times that a difference between the first driver attention level and the second driver attention level is greater than or equal to a predetermined value is greater than or equal to the predetermined number of times, the controller 120 may adjust a threshold level in a decreasing direction.

Specifically, when a state where the difference between the first driver attention level and the second driver attention level is greater than or equal to the predetermined value occurs, the controller 120 may increase a count value by 1, and when the count value is greater than or equal to the predetermined number of times, adjust the threshold level in a decreasing direction.

For example, as shown in FIG. 7, when the state where the difference between the first driver attention level and the second driver attention level is greater than or equal to the predetermined value is continuously maintained, the count value may increase, and when the count value is greater than or equal to the predetermined number of times, the threshold level may be adjusted in a decasing direction.

In this instance, the count value may be updated at predetermined periods. To this end, the controller 120 may compare the first driver attention level with the second driver attention level at every predetermined time (e.g., 30 seconds).

Also, according to embodiments, when a driver is changed or the vehicle 10 is turned off, the controller 120 may initialize the count value, and adjust the count value in a decreasing direction over time in order to identify an instantaneous increase in count value.

Hereinafter, embodiments of a control method of the vehicle 10 according to an aspect of the disclosure is described. The vehicle 10 according to the above-described embodiments may be used in the control method of the vehicle 10. Accordingly, the above description with reference to FIGS. 1 to 7 may be equally applicable to the control method of the vehicle 10.

Figure 8:
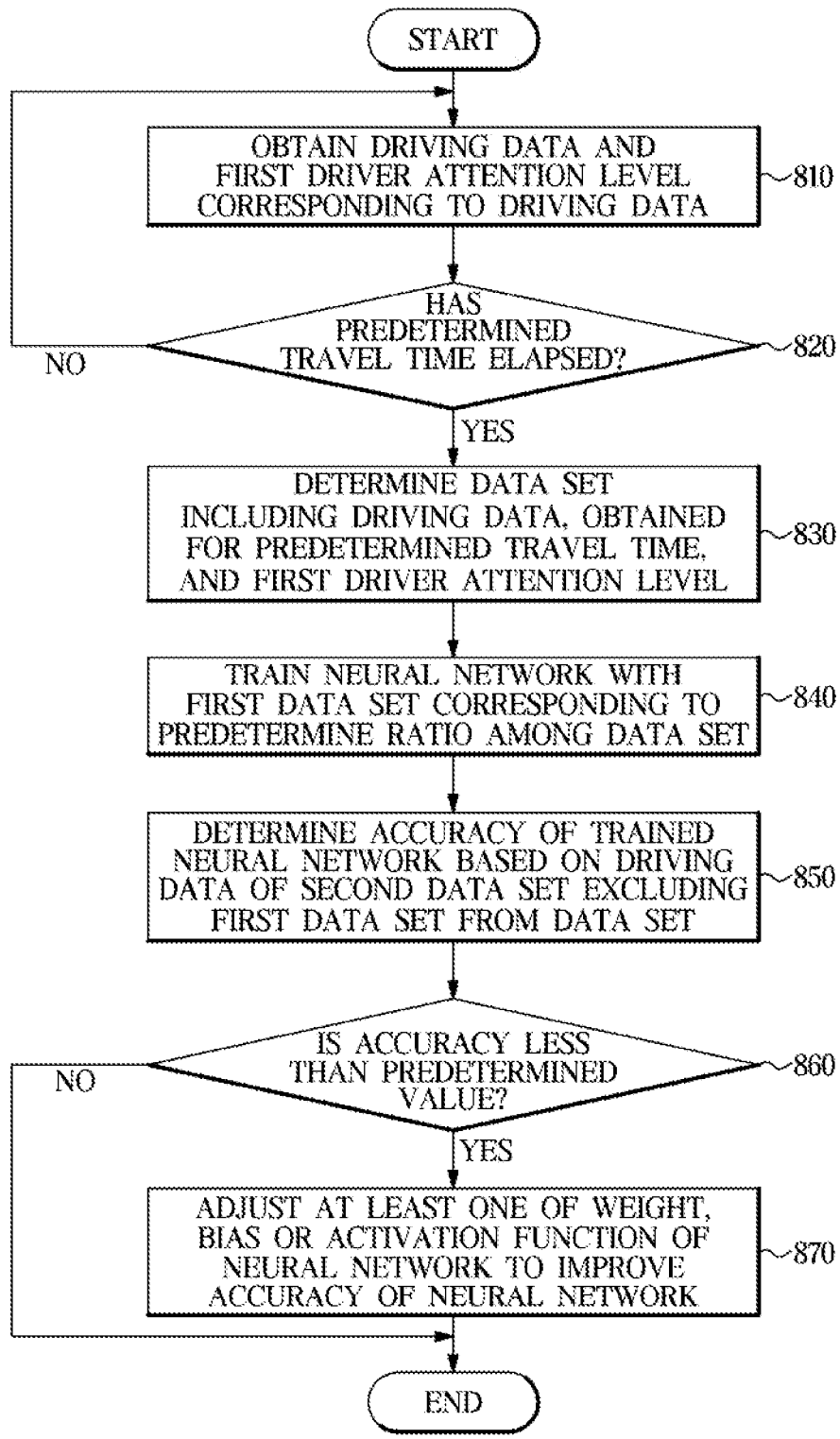
FIG. 8 is a flowchart illustrating operations of training a neural network in a control method of a vehicle according to an embodiment.

FIG. 8 is a flowchart illustrating operations of training the neural network 145*a* in a control method of the vehicle 10 according to an embodiment.

Referring to FIG. 8, according to an embodiment, the vehicle 10 may obtain driving data and a first driver attention level corresponding to the driving data (810). In this instance, the vehicle 10 may obtain the driving data and the first driver attention level corresponding to the driving data (810), until a predetermined travel time elapses (Yes in operation 820).

That is, the vehicle 10 may obtain the driving data, obtained from the DAW system 110 for the predetermined travel time (e.g., 1000 seconds), and the first driver attention level corresponding to each of the driving data obtained for the predetermined travel time, through the DAW system 110.

Afterwards, according to an embodiment, the vehicle 10 may determine the data set 400 including the driving data, obtained for the predetermined travel time, and the first driver attention level (830).

According to an embodiment, the vehicle 10 may train the neural network 145*a* with a first data set corresponding to a predetermine ratio among the data set 400 (840), and determine an accuracy of the trained neural network 145*b* based on driving data of a second data set excluding the first data set from the data set 400 (850).

In this instance, when the accuracy of the trained neural network 145*b* is less than a predetermined value (Yes in operation 860), the vehicle 10 may adjust at least one of a weight, a bias or an activation function of the neural network 145*b* to improve the accuracy of the neural network 145*b* (870).

Specifically, the controller 120 may determine a second driver attention level as an output of the neural network 145*b* in which the driving data of the second data set is input, and compare the second driver attention level with a first driver attention level of the second data set to determine the accuracy of the neural network.

When a difference between the second driver attention level corresponding to the output of the neural network 145*b* and the first driver attention level of the second data set is less than the predetermined value, the controller 120 determines that the accuracy is less than a predetermined accuracy and may adjust at least one of the weight, the bias, or the activation function of the neural network 145*b* to increase the accuracy of the neural network 145*b*.

As such, the vehicle 10 divides the data set 400 into two data sets, trains the neural network 145*a* with a single data set, and tests the trained neural network 145*b* using the other data set for re-training, thereby improving the accuracy of the neural network 145*b*.

In this instance, according to embodiments, the vehicle 10 trains the neural network 145*a* at every predetermined travel time, and thus the neural network 145*a* may be trained continuously.

Also, according to embodiments, the vehicle 10 may train a neural network corresponding to a current driver based on neural network information for each driver.

Figure 9:
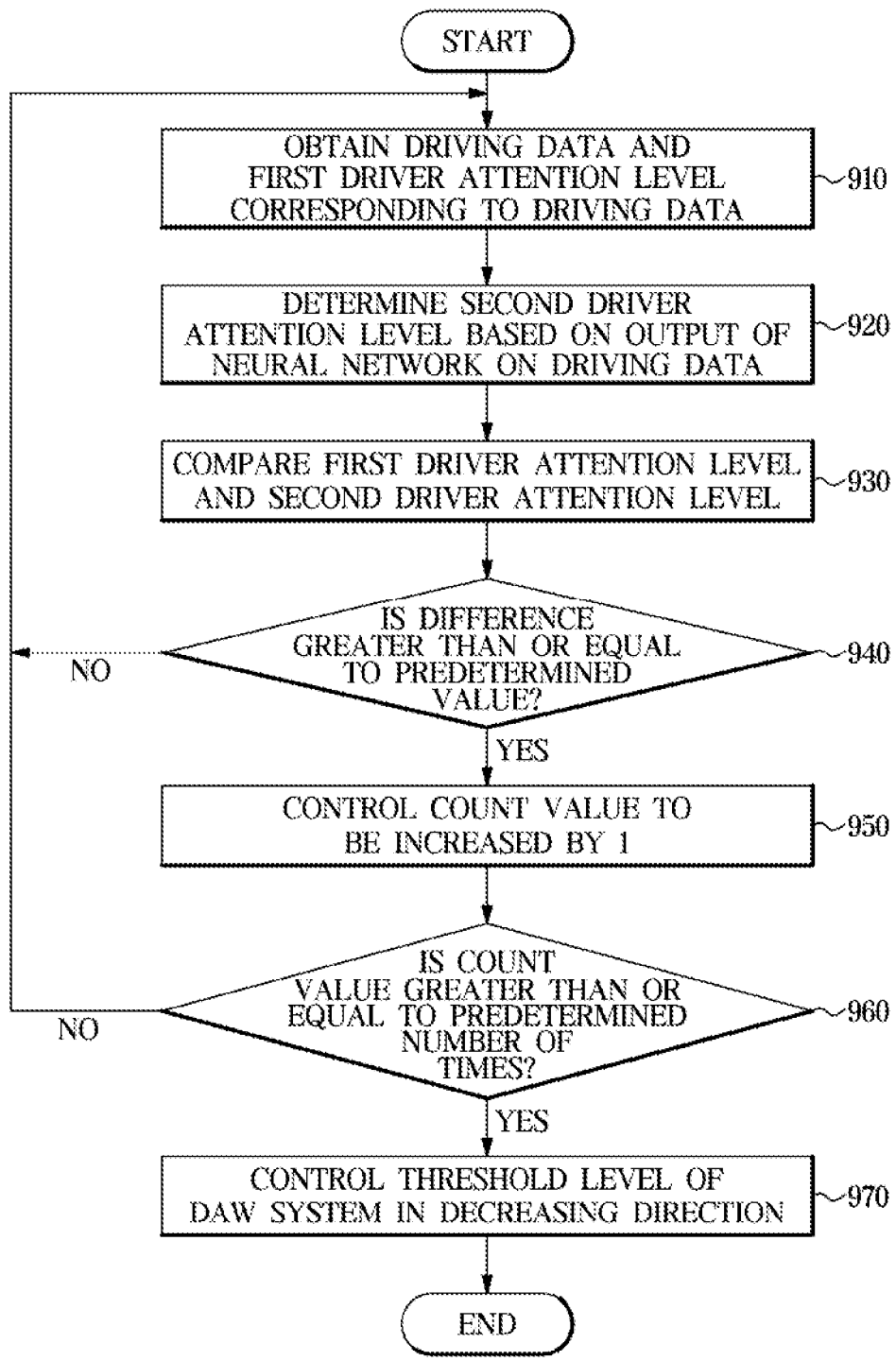
FIG. 9 is a flowchart illustrating operations of reducing a threshold level according to an embodiment.

FIG. 9 is a flowchart illustrating operations of reducing a threshold level according to an embodiment.

Referring to FIG. 9, according to an embodiment, the vehicle 10 may obtain driving data and a first driver attention level corresponding to the driving data (910).

According to an embodiment, the vehicle 10 may determine a second driver attention level based on an output of the neural network 145*b* on the driving data (920), and compare the first driver attention level and the second driver attention level (930).

According to an embodiment, when a difference between the first driver attention level and the second driver attention level is greater than or equal to a predetermined value (Yes in operation 940), the vehicle 10 may control a count value to be increased by 1 (950). Also, when the count value is greater than or equal to the predetermined number of times (Yes in operation 960), the vehicle 10 may adjust a threshold level of the DAW system 110 in a decreasing direction (970). In this instance, the count value may be updated at predetermined periods. To this end, the controller 120 may compare the first driver attention level with the second driver attention level at every predetermined time (e.g., 30 seconds).

Also, according to embodiments, the vehicle 10 may initialize the count value, when a driver is changed or the vehicle 10 is turned off, and adjust the count value in a decreasing direction over time in order to identify an instantaneous increase in count value.

As is apparent from the above, according to the embodiments of the disclosure, the vehicle and the control method thereof can compare a driver attention level obtained by an output of a neural network and a driver attention level obtained by an output of a DAW system, thereby outputting a driver attention warning more accurately.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. An attention warning system for a vehicle, comprising:
   a user interface;
   a driver attention warning (DAW) system configured to determine a first driver attention level based on driving data, and if the first driver attention level is less than or equal to a threshold level, control the user interface to output a warning; and
   a controller configured to:
   determine a second driver attention level based on an output of a neural network on driving data;
   compare the first driver attention level and the second driver attention level at predetermined time periods a plurality of times; and
   adjust the threshold level in a decreasing direction if: (a) a compared difference between the first driver attention level and the second driver attention level is determined to be greater than or equal to a predetermined value, and (b) a number of the compared differences that are equal to or greater than the predetermined value is recognized for a number of times that is greater than or equal to a predetermined number of times,
   wherein the neural network is configured to be trained with driving data and the first driver attention level.

2. The system of claim 1, wherein the controller is further configured to determine a data set including driving data obtained for a predetermined travel time period, and the first driver attention level corresponds to the driving data obtained for the predetermined travel time period.

3. The system of claim 2, wherein the controller is further configured to:
   train the neural network with a first data set corresponding to a predetermined ratio from among the data set; and
   determine an accuracy of the neural network based on driving data of a second data set that excludes the first data set from the data set.

4. The system of claim 3, wherein the controller is further configured to:
   determine the second driver attention level as an output of the neural network receiving driving data of the second data set as an input; and
   compare the determined second driver attention level with the first driver attention level of the second data set to determine the accuracy of the neural network.

5. The system of claim 3, wherein the controller is further configured to adjust at least one of: a weight, a bias, and/or an activation function of the neural network to thereby increase the accuracy of the neural network.

6. The system of claim 3, wherein the controller is further configured to train the neural network at every predetermined travel time period.

7. The system of claim 1, wherein the controller is further configured to determine the second driver attention level through a neural network corresponding to a current driver based on neural network information for each driver.

8. The system of claim 1, wherein the controller is further configured to:
   increase a count value by 1, if a state where the difference between the first driver attention level and the second driver attention level is greater than or equal to the predetermined value occurs; and adjust the threshold level in the decreasing direction if the count value is greater than or equal to the predetermined number of times.

9. The system of claim 8, wherein the controller is further configured to initialize the count value when a driver is changed or the vehicle is turned off.

10. The system of claim 8, wherein the controller is further configured to adjust the count value in a decreasing direction over time.

11. The system of claim 1, wherein the driving data includes at least one of: a lane departure state, a steering angle, a steering torque, a speed, an accelerator pedal state, a brake pedal state, a control state of a smart cruise control (SCC), a turn signal control state, an emergency light control state, a door open/closed state, a seat belt wearing state, a longitudinal/lateral acceleration, a wheel speed, a gear stage, and/or a travel time after a break.

12. A control method of a vehicle, the control method comprising:
providing a user interface and a driver attention warning (DAW) system configured to determine a first driver attention level based on driving data, and if the first driver attention level is less than or equal to a threshold level, control the user interface to output a warning;
determining a second driver attention level based on an output of a neural network on driving data;
comparing the first driver attention level and the second driver attention level at predetermined time periods a plurality of times; and
adjusting the threshold level in a decreasing direction if (a) a compared difference between the first driver attention level and the second driver attention level is determined to be greater than or equal to a predetermined value, and (b) a number of compared differences that are equal to or greater than the predetermined value is recognized for a number of times that is greater than or equal to a predetermined number of times,
wherein the neural network is configured to be trained with driving data and the first driver attention level.

13. The control method of claim 12, further comprising:
determining a data set including driving data obtained for a predetermined travel time period, and the first driver attention level corresponds to the driving data obtained for the predetermined travel time period.

14. The control method of claim 13, further comprising:
training the neural network with a first data set corresponding to a predetermined ratio from among the data set; and
determining an accuracy of the neural network based on driving data of a second data set that excludes the first data set from the data set.

15. The control method of claim 14, wherein the determining of the accuracy of the neural network step further comprises:
determining the second driver attention level as an output of the neural network receiving driving data of the second data set as an input; and
comparing the determined second driver attention level with the first driver attention level of the second data set to determine the accuracy of the neural network.

16. The control method of claim 14, further comprising:
adjusting at least one of: a weight, a bias, and/or an activation function of the neural network to thereby increase the accuracy of the neural network.

17. The control method of claim 14, wherein the training of the neural network comprises training the neural network at every predetermined travel time period.

18. The control method of claim 12, wherein the determining of the second driver attention level step further comprises determining the second driver attention level through a neural network corresponding to a current driver based on neural network information for each driver.

19. The control method of claim 12, wherein the adjusting of the threshold level in the decreasing direction step further comprises:
increasing a count value by 1, if the difference between the first driver attention level and the second driver attention level is greater than or equal to the predetermined value; and
adjusting the threshold level in the decreasing direction if the count value is greater than or equal to the predetermined number of times.

20. The control method of claim 19, wherein the adjusting of the threshold level in the decreasing direction step further comprises initializing the count value when a driver is changed or the vehicle is turned off.

* * * * *